United States Patent
Siragusa et al.

(10) Patent No.: US 12,210,524 B1
(45) Date of Patent: Jan. 28, 2025

(54) UPDATE TECHNIQUES FOR MATERIALIZED VIEWS GENERATED FROM TABLES SHARED FROM EXTERNAL DATABASES

(71) Applicant: Amazon Technologies, Inc., Seattle, WA (US)

(72) Inventors: Enrico Siragusa, Berlin (DE); Gaurav Saxena, Cupertino, CA (US); Mario Guerriero, Berlin (DE); Christoforos Svingos, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 4 days.

(21) Appl. No.: 18/067,498

(22) Filed: Dec. 16, 2022

Related U.S. Application Data

(60) Provisional application No. 63/385,002, filed on Nov. 25, 2022.

(51) Int. Cl.
  *G06F 16/2453* (2019.01)
  *G06F 16/23* (2019.01)

(52) U.S. Cl.
  CPC .... *G06F 16/24539* (2019.01); *G06F 16/2393* (2019.01)

(58) Field of Classification Search
  CPC .............. G06F 16/24539; G06F 16/2393
  See application file for complete search history.

(56) References Cited

U.S. PATENT DOCUMENTS

| | | | |
|---|---|---|---|
| 7,672,964 B1* | 3/2010 | Yan ................... | G06F 16/24568 |
| | | | 707/999.102 |
| 2011/0137875 A1* | 6/2011 | Ziauddin ............ | G06F 16/2393 |
| | | | 707/693 |
| 2019/0171650 A1* | 6/2019 | Botev ................. | G06F 16/2358 |
| 2020/0250176 A1 | 8/2020 | Padmanabhan | |
| 2020/0379993 A1* | 12/2020 | Rajaperumal ..... | G06F 16/24552 |
| 2020/0379997 A1 | 12/2020 | Rajaperumal et al. | |
| 2022/0300491 A1 | 9/2022 | Gruszecki et al. | |
| 2023/0409574 A1* | 12/2023 | Akidau ............. | G06F 16/24542 |

OTHER PUBLICATIONS

U.S. Appl. No. 17/724,300, filed Apr. 19, 2022, Gaurav Saxena et al.

* cited by examiner

*Primary Examiner* — Mark D Featherstone
*Assistant Examiner* — Kweku William Halm
(74) *Attorney, Agent, or Firm* — S. Scott Foster; Kowert, Hood, Munyon, Rankin & Goetzel, P.C.

(57) ABSTRACT

A materialized view created from one or more shared producer tables in separate producer clusters may be stored in a consumer cluster. The materialized view May undergo faster a refresh using an incremental refresh by obtaining snapshots of the producer table and incrementally refreshing based on deltas obtained by the snapshot. The materialized view may undergo various checks to determine whether the materialized view in the consumer resource is refreshable or unrefreshable based on schema compatibility. The materialized view may undergo further checks to determine whether the materialized view in the consumer resource is available or unavailable for incremental refresh based on detection of schema/data rearrangement operations on the producer table.

20 Claims, 9 Drawing Sheets

UPDATE TECHNIQUES FOR MATERIALIZED VIEWS GENERATED FROM TABLES SHARED FROM EXTERNAL DATABASES

RELATED APPLICATIONS

This application claims benefit of priority to U.S. Provisional Application Ser. No. 63/385,002, entitled "UPDATE TECHNIQUES FOR MATERIALIZED VIEWS GENERATED FROM TABLES SHARED FROM EXTERNAL DATABASES," filed Nov. 25, 2022, and which is incorporated herein by reference in its entirety.

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing. For example, data processing is often measured by the speed at which requests to access data are performed. Many types of data access requests require intensive computational and storage access workloads. As data stores may have to process high workload access requests, techniques that reduce computational load, such as techniques that provide materialized views, may be implemented.

Figure 1:
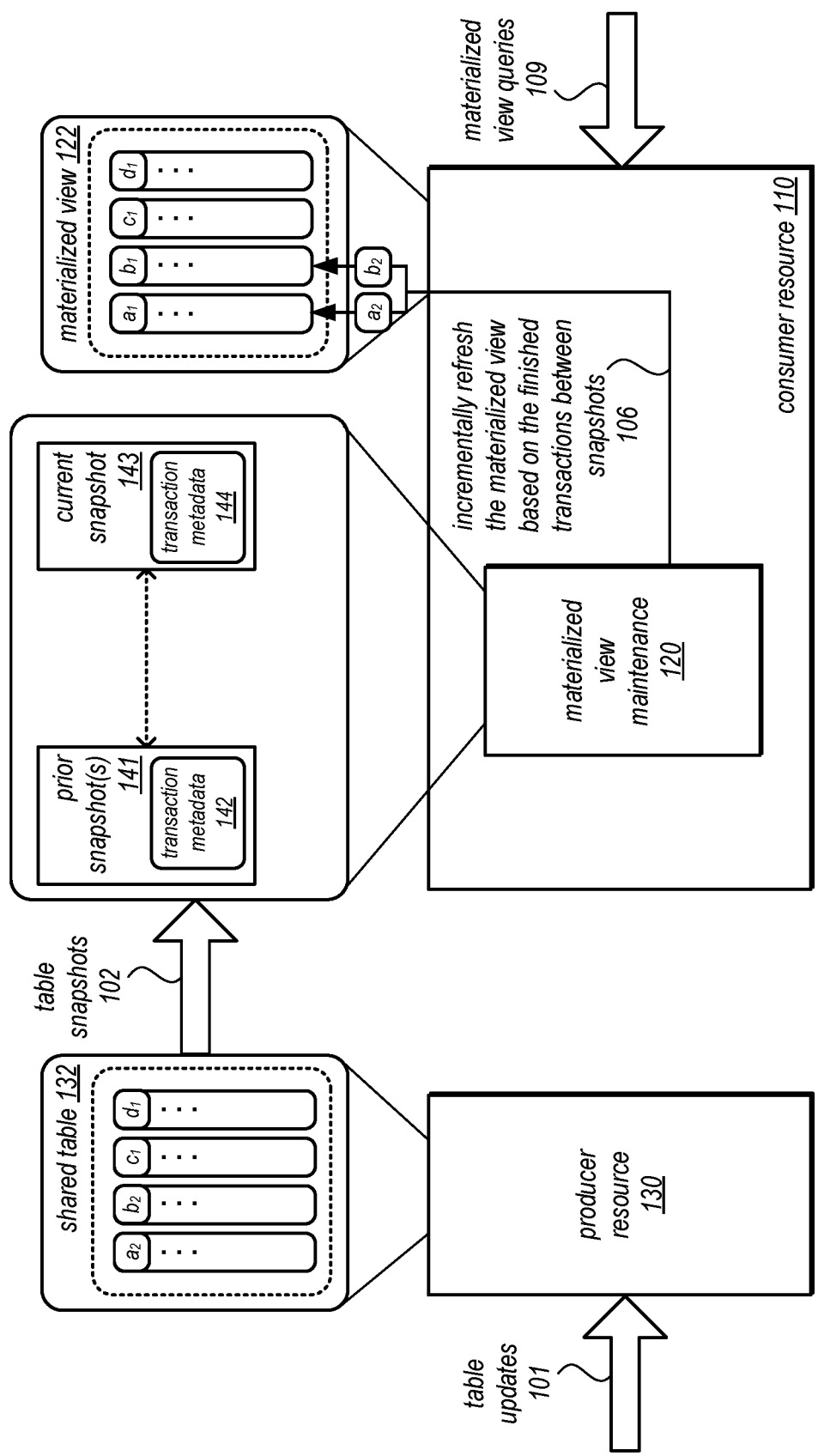
FIG. 1 is a logical block diagram illustrating update techniques for materialized views generated from tables shared from external databases, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for incrementally refreshing, using a snapshot of a data sharing producer table, a materialized view (MV) in a consumer resource created from the shared producer table in a producer resources are described herein. Materialized views may be created for databases to offer a performance benefit to client applications because the results of a query stored as a materialized view may not have to be performed again in order to obtain information already found in the materialized view, in various embodiments. For example, instead of submitting the same query to database, the query may be submitted once to create the materialized view to obtain information. Then, when the information is desired again, a query may be directed to the materialized view which already stores the information, saving computing resources to find, evaluate, combine, and/or otherwise process database data into a result for the query (or a query that is based on or could use the result of the query that is used to create the materialized view).

In some embodiments, the materialized view may be generated in a consumer resource (e.g., a consumer cluster) separate from a producer resource (e.g., a producer cluster), which may be a separate and external (to producer resource)

database system, such that the materialized view is generated from one or more base tables shared from one or more of the producer resources. The one or more shared base tables may be owned, managed, or otherwise controlled via the produce resources. However, sharing the one or more base tables may grant the consumer resource read access to the base tables, including the use of base tables to generate a materialized view. However, the materialized view generated at the consumer resource may not be specified, defined, or controlled by the producer resource and, therefore, any changes to the one or more base tables can be performed by the producer resource without coordination with the consume resource. Therefore, updates to the materialized view may have to account for ongoing operations at a producer cluster which may affect the contents of the materialized view at the consumer cluster.

Different techniques for refreshing the materialized view may be performed at the consumer resource. For example, the materialized view in the consumer resource may be refreshed with a full recompute, which performs operations to complete recreate the materialized view by perform queries to the sources for the materialized view, such as the one or more base tables shared by one (or more) producer resources. While the full recompute can provide a fresh version of the materialized view that is current, full recompute is performing all of the operations of the materialized view queries and thus forgoes any computational benefits that the materialized view provides (e.g., a query has to read the base tables instead of the already generated results in the materialized view).

Another update technique that can be performed at the consumer resource is an incremental refresh technique, which can make updates to portions of a materialized view (e.g., particular rows, fields, columns, or other objects) without accessing those portions of the materialized view that have not changed. For example, incremental refresh may the deltas (e.g., changed values) of base table changes that have been committed since the previous incremental refresh (or recompute) of the materialized view by accessing snapshots of the base tables of the producer resources from which these deltas can be obtained.

FIG. 1 is a logical block diagram illustrating update techniques for materialized views generated from tables shared from external databases, according to some embodiments. In some embodiments, instead of a table, the data or information may be organized into other collections, groups, or sets of related information. In some embodiments, table(s) may be organized according to a table schema that specifies the number and data types (e.g., character, string, integer, floating point, etc.), column names, and/or other table information. Entries of table(s) may be individual items or rows that include values for different columns (including null values in some embodiments).

A consumer resource 110 may store a materialized view 122 created from one or more tables shared from one or more producer resources. For example, producer table 132 managed by a producer resource 130 may be used to create the materialized view 122. In some embodiments, the producer table 132 may be stored in separate storage system from produce resource 130. In some embodiments, the producer resource 130 and consumer resource 110 may be part of a database service or other data store that provides management, maintenance, and/or access to data or information using separate accounts or other access controls that restrict access to the particular accounts resources and data, unless a data share for specific data, such as producer table 132 has been established. For example, the producer resource 130 and consumer resource 110 may each respective relational database systems that provide online transactional processing (OLTP), such as may be found in databases supporting transaction heavy workloads, or online analytical processing (OLAP), such as may be data warehouse style databases that support heavy analytical workloads. Further examples of establishing a data share between the producer resource 130 and the producer table 132 are discussed with regard to FIG. 2 below. The materialized view 122 may be stored in a consumer resource 110 and treated as data object owned or controlled by consumer resource 110 (and not produce resource 130 even though producer resource 130 provides the data for materialized view 122). In this way, both producer resource 130 and its respective producer table 132 and consumer resource 110 and its materialized view 122 may operate independently without causing interference to the other resource. Instead, techniques for materialized view update as discussed with regard to the various embodiments below may preserve this independence while ensuring that materialized view 122 is kept up-to-date.

Incremental materialized view maintenance 120 may be implemented as part of a separate system, such as a control plane component for a database service like database service 210 or may be implemented as part of a computing resource itself, like consume resource 110. Incremental materialized view maintenance 120 may perform various validity and staleness determinations 104 to determine whether an update to a materialized view should be performed as well as the type of update technique (e.g., recompute or incremental refresh). For example, the incremental materialized view maintenance 120 may determine whether a materialized view of a shared producer table is able to be refreshed at all based on changes to the schema of a shared table as a materialized view may be created dependent upon a particular schema of a base table which may be invalid after a change to the schema of the base table. In some scenarios, the materialized view 122 may be subject to operations on the producer table such as RENAME and DROP that may change the schema of the materialized view 122 that prevents the materialized view 122 from being able to be refreshed. The determination of whether the materialized view is able to be refreshed will be further discussed in FIGS. 3A-3B.

Based on a successful determination that the materialized view 122 may be refreshed, the incremental materialized view maintenance 120 may determine whether the materialized view 122 is to be updated using a full recompute or is able to be incrementally refreshed. For example, schema rearrangement operations that preserve schema validity may require a full recompute of the materialized view. The determination as to whether the materialized view is able to be incrementally refreshed or requires full recompute will be further discussed in FIG. 4.

In some embodiments, the incremental materialized view maintenance 120 may perform a staleness check on the materialized view 122, or any portions therein, by using a snapshot of the shared producer table and incrementally refresh the materialized view based on the snapshot. Staleness of a materialized view may occur when the materialized view does not provide some data that should be visible to a query or other access request that will use the materialized view and thus the data in the materialized view is stale. For example, FIG. 1 illustrates a producer table 132 with an updated data columns $a_2$ and $b_2$ whereas the materialized view 122 reflects older data, data $a_1$ and $b_1$. If, for example, a query occurs at the consumer resource 110 and the more current values of producer table 132 should be exposed to the query, then values $a_1$ and $b_1$ may be considered stale. Based on the snapshot 142 obtained by the incremental materialized view maintenance 120 from the producer resource 130 and comparing transactions metadata 144 from the snapshots indicating set of active transactions that were committed or rolled back between previous snapshots, the incremental materialized view maintenance 120 may determine that the data in columns a and b of the materialized view 122 are stale. Upon determination that the materialized view 122 is stale, changes between the current snapshot 143 and prior snapshot 141 used to create the materialized view 122 are determined, and the changes used to incrementally refresh materialized view 122 (e.g., by updating individual records and leaving other records unchanged instead of recomputing the entire materialized view 122). The incremental refresh of the materialized view 122 will be further discussed in FIGS. 3A-3B. In some embodiments, the incremental refreshing of the MV may be performed on a MV created from data sharing tables from multiple producers as well as multiple local tables. The MVs may be refreshed when materialized view queries 109 are received (e.g., queries that reference directly materialized views or cause them to be used, such as by intelligent use of materialized views that are inserted into a query by consumer resource 110).

Please note that the previous description of a database, table, materialized view, snapshots, and various interactions are logical descriptions and thus is not to be construed as limiting as to the implementation of these features.

This specification continues with a general description of a provider network that implements database services (or other data storage or processing services) that may implement update techniques for materialized views generated from tables shared from external databases. Then various examples of one such database service, including different components/modules, or arrangements of components/module that may be employed as part of implementing the techniques are discussed. A number of different methods and techniques to implement update techniques for materialized views generated from tables shared from external databases, some of which are illustrated in accompanying flowcharts, are then discussed. Finally, a description of an example computing system upon which the various components, modules, systems, devices, and/or nodes may be implemented is provided. Various examples are provided throughout the specification.

Figure 2:
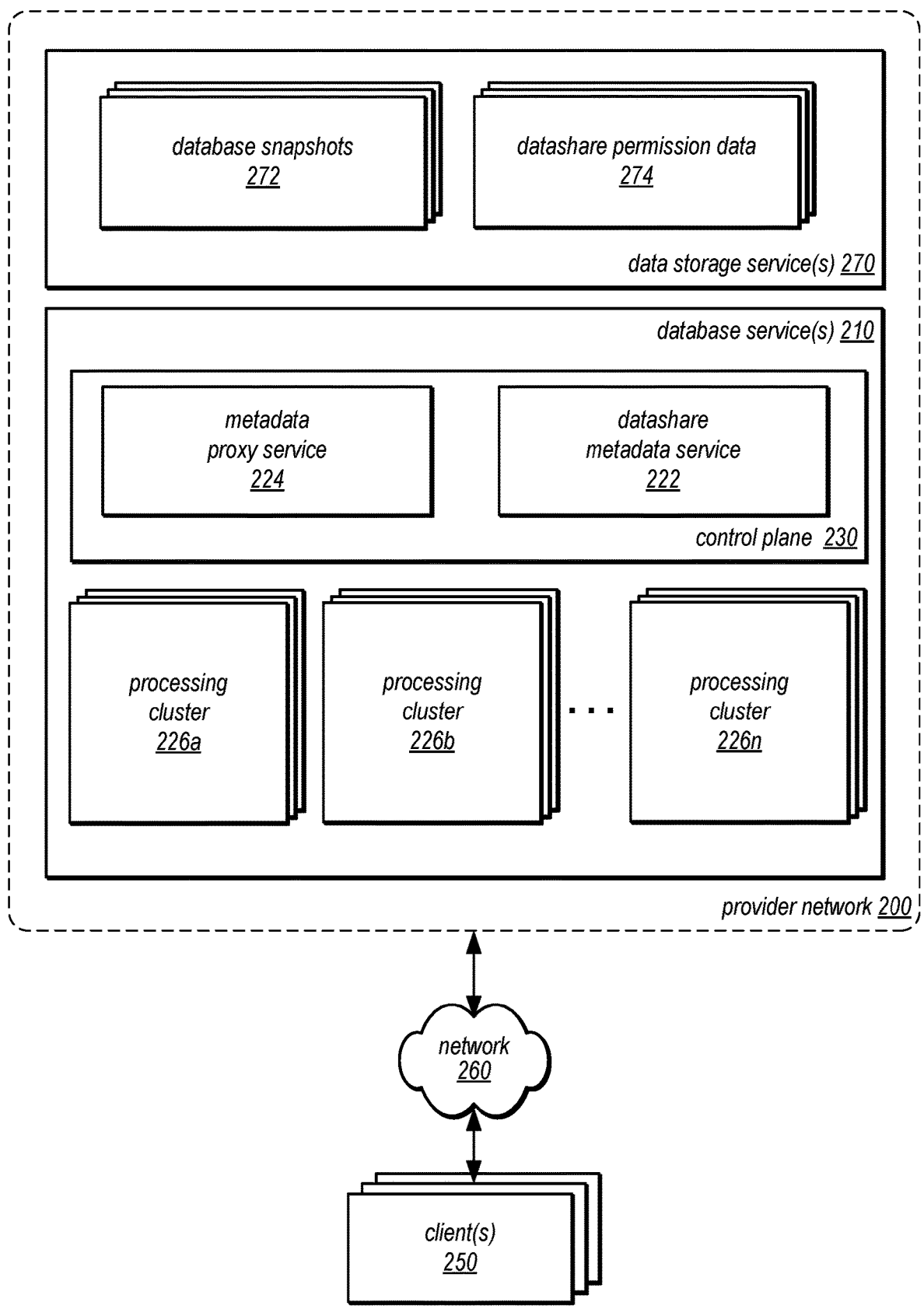
FIG. 2 is a logical block diagram illustrating a provider network offering a database service that provides incremental refresh of materialized views for databases hosted in the database service, according to some embodiments.

FIG. 2 is a logical block diagram illustrating a provider network offering a database service that provides materialized views for databases hosted in the database service and provides incremental refresh of the materialized views, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 900 described below with regard to FIG. 8), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational database service) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via a Server Query Language request (SQL) interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service, in one embodiment. In other embodiments, database services 210 may locally store, managed, and access semi-structured or not-structured data (e.g., an object-based and/or key-value data store that stores tables joined with tables in other services, such as database service(s) 210 or the same storage service).

In at least some embodiments, a database service 210 may be a data warehouse service or other database that stores data across multiple storage locations (e.g., across different nodes in a processing cluster). In such scenarios a data warehouse service, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (e.g., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 900 described below with regard to FIG. 8, in some embodiments. Different subsets of these computing devices may be controlled by control plane 230. Control plane 230, for example, may provide an interface to clients or users who wish to interact with the processing clusters 226 managed by control plane 230. For example, the interface may implement one or more Application Programming Interfaces (APIs) to allow client systems to programmatically invoke database service operations, functions, or other features and/or the interface may implement or provide one or more graphical user interfaces (GUIs) for storage clients (e.g., as a web-console). The interface may allow clients to select various control functions offered by database service 210 for the processing clusters 226 hosted in the database service 210, in some embodiments. For example, a user may adjust workload allocations, prioritization schemes, cluster size, network mappings or other operations or tasks for performing a query.

Control plane 230 may also implement various systems to manage or implement database service 210 features. For example, control plane 230 may implement datashare metadata service 222 and a metadata proxy service 224. These systems may be used to implement datashares accessible across provider network regions. Data used to implement these features, such as datashare permission data 274 may be maintained in separate data storage service(s) 270, in some embodiments. In some embodiments, database data 272 may be created and hosted in a data storage service on behalf of a data owner or other entity, referred to herein as the producer. The database data 272 may be one or more database stored for in a data lake or other data storage system (e.g., remote or attached to producer database engine). In some embodiments, the database service 210 may furthermore implement producer database engines (such as engines implemented in one or more processing clusters 226) which may provide access to the database data. The producer database engine may receive a request to share database data and thereby obtain the role of "producer" for database data (e.g., as data may be added or removed to database data via producer database engine). Sharing the database may create a "datashare" object (e.g., a logical object, such as an identifier for the datashare allowing the datashare to be referenced in various requests to manage or access the datashare). Producer database engine may propose database sharing authorization with a client. Once one or more portions of the database data 272 may confirmed according to datashare permission data 274. In some embodiments, the metadata proxy service 224 may be used to obtain schema and active transactions of the producer cluster and or permissions to access tables on the producer cluster and the datashare metadata service 222 used to retrieve the metadata to access the database data 272 of producer table stored in the storage service 270.

As discussed above, various clients (or customers, organizations, entities, or users) may wish to store and manage data using a database service 210. Processing clusters 226 may respond to various requests, including write/update/store requests (e.g., to write data into storage) or queries for data (e.g., such as a Server Query Language request (SQL) for particular data). For example, multiple users or clients may access a processing cluster to obtain data warehouse services.

Database service 210 may provide database endpoints directly to the clusters which allow the users manage in order to implement client applications that send requests and other messages directly to a particular cluster. Database endpoints, for example may be a network endpoint associated with a particular network address, such as a URL, which points to a resources, such as processing clusters 226 that are attached to the database for query processing. For instance, a client may be given the network endpoint "http://mycluster.com" to send various request messages to. Multiple clients (or users of a particular client) may be given a database endpoint for the same database. Various security features may be implemented to prevent unauthorized users from accessing the databases.

In at least some embodiments, database service 210 may implement a proxy service (not illustrated) to provide access to databases (e.g., data warehouses) hosted in database service 210. For databases managed by database service 210, database service 210 may provide database endpoints (e.g., network endpoints) for a hosted database. Database endpoints may not provide direct access to a particular processing cluster 226, as the processing cluster used to respond to such requests (e.g., queries) may change according to the various scaling techniques. Instead, client applications may utilize the database endpoint for a database to be included in various client applications or other communications for database access so that proxy service can direct the requests to the appropriate processing cluster without the client application having to be altered every time a change in processing cluster (e.g., scaling operations) are performed by database service 210. In this way, database service 210 can perform scaling and other management operations without interfering with client applications.

Processing clusters, such as processing clusters 226a, 226b, and 226c, hosted by database service 210 may provide an enterprise-class database query and management system that allows users to send data processing requests to be executed by the clusters 226, such as by sending a query. Processing clusters 226 may perform data processing operations with respect to data stored locally in a processing cluster, as well as remotely stored data. For example, data storage service 270 implemented by provider network 200 that stores remote data, such as backups or other data of a database stored in a cluster. In some embodiments, database data 272 may not be stored locally in a processing cluster 226 but instead may be stored in data storage service 270 (e.g., with data being partially or temporarily stored in processing cluster 226 to perform queries). Queries sent to a processing cluster 226 (or routed/redirect/assigned/allocated to processing cluster(s)) may be directed to local data stored in the processing cluster and/or remote data.

In some embodiments, database service 210 may have at least one processing cluster attached to a database, which may be the "primary cluster." Primary clusters may be reserved, allocated, permanent, or otherwise dedicated processing resources that store and/or provide access to a database for a client, in some embodiments. Primary clusters, however, may be changed. Techniques to resize or change to a different configuration of a primary cluster may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity for a primary cluster.

As databases are created, updated, and/or otherwise modified, snapshots, copies, or other replicas of the database at different states may be stored separate from database service 210 in data storage service 270, in some embodiments. For example, a leader node, or other processing cluster component, may implement a backup agent or system that creates and store database backups for a database to be stored as database snapshots 272 in data storage service 270. Database snapshots 272 may include user data (e.g., tables, rows, column values, etc.) and database metadata (e.g., information describing the tables which may be used to perform queries to a database, such as schema information, data distribution, range values or other content descriptors for filtering out portions of a table from a query, etc.). A timestamp or other sequence value indicating the version of database snapshots 272 may be maintained in some embodiments, so that the latest database snapshot 272 may, for instance, be obtained by a processing cluster in order to perform queries. In at least some embodiments, database snapshots 272 may be treated as the authoritative version of data, and data stored in processing clusters 226 for local processing as a cached version of data.

Data storage service 270 may implement different types of data stores for storing, accessing, and managing data on behalf of clients 250 as a network-based service that enables clients 250 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object.

In at least some embodiments, data storage service(s) 270 may be treated as a data lake. For example, an organization may generate many different kinds of data, stored in one or multiple collections of data objects in a data storage service 270. The data objects in the collection may include related or homogenous data objects, such as database partitions of sales data, as well as unrelated or heterogeneous data objects, such as audio files and web site log files. Data storage service(s) 270 may be accessed via programmatic interfaces (e.g., APIs) or graphical user interfaces.

Generally speaking, clients 250 may encompass any type of client that can submit network-based requests to provider network 200 via network 260, including requests for storage services (e.g., a request to create a datashare at a database service 210, or a request to create, read, write, obtain, or modify data in data storage service(s) 270, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 210 or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service).

Clients 250 may convey network-based services requests (e.g., access requests to read or write data may be directed to data in data storage service(s) 270, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210 and/or data storage service(s) 270 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Various clients (or customers, organizations, entities, or users) may wish to store and manage data using database service 210, in some embodiments. Processing clusters, such as processing clusters 226a, 226b, and 226n may respond to various requests, including write/update/store/redistribute requests (e.g., to add data into storage) or other queries for data (e.g., such as a Server Query Language request (SQL) for particular data), along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service, in some embodiments.

Multiple users or clients may access a processing cluster 226 to obtain data warehouse services, in one embodiment. In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 226 may provide an enterprise-class database query and management system that allows users to send data processing requests to be executed by the clusters 226, such as by sending a data processing request to a cluster control interface implemented by the processing clusters, in some embodiments. Processing clusters 226 may perform data processing operations with respect to data stored locally in a processing cluster. Requests sent to a processing cluster 226 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from and/or external to the processing clusters, such as data stored in another service.

Processing clusters 226 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently, in various embodiments. In other embodiments, database service 210 and/or processing clusters 226 may offer query capabilities may query over other types of data (e.g., semi-structured data, unstructured data, various other kinds of data, such as media, or no-schema data).

Figure 3A:
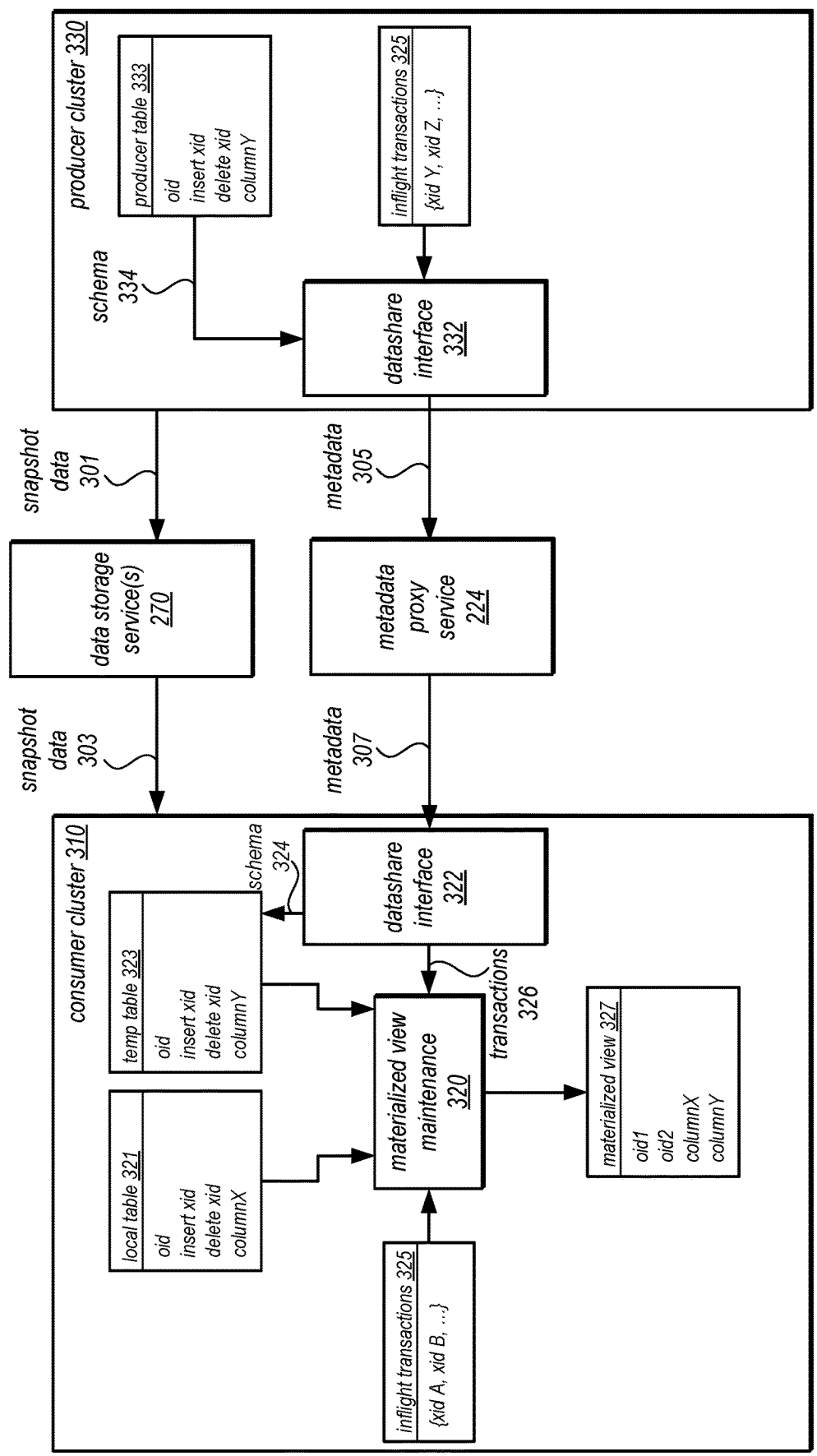
FIG. 3A is a logical block diagram illustrating interactions between consumer and producer clusters for updating a materialized view created from a shared table, according to some embodiments.

FIG. 3A is a logical block diagram illustrating interactions between consumer and producer clusters for updating a materialized view created from a shared table, according to some embodiments. Consumer cluster 310 may be a processing cluster (e.g., similar to processing clusters 226 in FIG. 2) which may have access to a shared table (e.g., producer table 333). Producer cluster 330 may accept reads (e.g., queries) and writes (e.g., inserts, deletes, and modifications of data values) to producer table 333. These changes may be recorded in snapshots 301 to data storage services 270. Consumer cluster 310 may access 303 these snapshots and use provided schema information 324 (e.g., 334, through data share interface 332, as part of metadata 305 to metadata proxy service 224 and metadata 307 to data share interface 322) to read temp table 323 (e.g., a local temporary copy of shared producer table 333).

As illustrated in FIG. 3A, local table 321 and temp table 323 may be used to create materialized view 327 via materialized view maintenance 320. Materialized view maintenance 320 may create materialized views for databases (e.g., in response to create materialized view requests) to offer a performance benefit to client applications because the results of a query stored as a materialized view may not have to be performed again in order to obtain information already found in the materialized view. In some embodiments, materialized view maintenance 220 may be used to create materialized view in a consumer processing cluster separate from a producer processing cluster such that the materialized view is generated from one or more source tables shared by the producer processing cluster (e.g., producer table 333). The materialized view maintenance 220 may be used to refresh the materialized view with a full recompute or undergo faster incremental refresh using only the changes to the of base table that have been made since the previous update to the materialized view.

For example, a full recompute may be performed by recreating materialized view 327 by querying again both local table 321 and temp table 323. Thus, materialized view 327 may be recreated (e.g., rewritten) entirely. For an incremental refresh, materialized view 327 may be selectively updated according to the differences between a current snapshot and prior snapshot of source tables, including temp table 323. In this way, only those changes to materialized view 327 that need to be performed are performed and data that remains unchanged does not have to be rewritten or recreated.

In order to determine whether a materialized view update should be performed, consumer processing cluster may determine whether the materialized view is stale for performing a query. For example, commits to MV's base tables may be a sequence of snapshots $s\_0, \ldots, s\_n$ where each snapshot $s\_i=(h\_i, A\_i)$ consists of the highest committed written transaction $h\_i$ and a set of active transactions $A\_i=\{a\char`^1\_i, \ldots, a\char`^m\_i\}$ at the time of taking snapshot i. A materialized view that is refreshed at time n considers an interval $[s\_k, s\_n]$ of snapshots where k is the time of the previous refresh and n is the time of the current refresh. Each snapshot $s\_i$ may be a valid state for an incremental refresh.

In some embodiments, transaction ids (xid) that are finished (finished_xid) may be the set of active transactions that have been committed or rolled back between previous snapshot s_k and current snapshot s_n, i.e. $\{a\char`^j\_k \text{ in } A\_k: a\char`^j\_k \text{ is committed by } s\_n\}$. In some embodiments, a min_finished_xid may be a minimum of the finished_xids. In addition, max_dml_xid may be the maximum data manipulation language (DML) xid of all base tables used in the MV. In some embodiments, the DML_xid may be xid arising from any of the computer languages permitting users to manipulate data in a database.

Figure 3B:
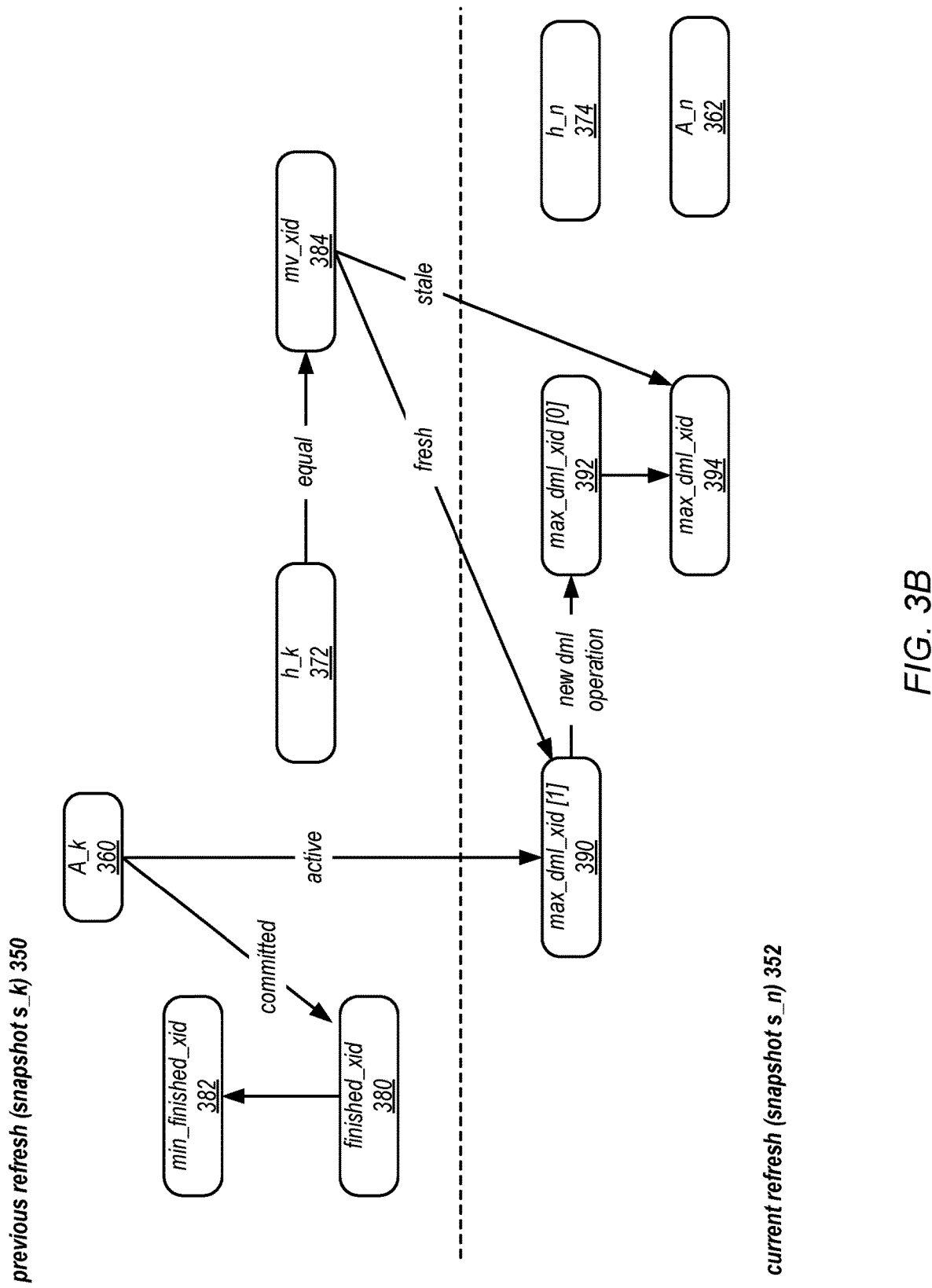
FIG. 3B is a logical block diagram illustrating an example of incremental refresh with a shared table, according to some embodiments.

An example of a staleness check technique to determine whether the MV is fresh may be:
//The MV is already refreshed up to the current or a later snapshot.
if (mv_xid>=h_n) then fresh
//The MV was marked for recompute, e.g., after TRUNCATE on some source table.
if (mv_xid==InvalidTransactionId) then stale
//At least one max_dml_xid is not set.
if (max_dml_xid==InvalidTransactionId) then stale
//At least one of the MV's base tables has been modified.
if (max_dml_xid>mv_xid) then stale
//Committed DML could be a finished transaction.
if (max_dml_xid>=min_finished_xid) then stale
otherwise fresh FIG. 3B is a logical block diagram illustrating an example of incremental refresh with a shared table, in some embodiments.

For example, as illustrated in FIG. 3B, a previous refresh from snapshot s_k 350 may include a set of active transactions (A_k) 360 and a highest committed written transaction (h_k) 372 at time k that the snapshot s_k was taken. A finished_xids 380 may be a set of active transactions from the previous refresh 350 that that have been committed or rolled back between previous snapshot s_k and current refresh from snapshot s_n 352. Similar to snapshot s_k, the snapshot s_n may include a set of active transactions (A_n) 362 and a highest committed written transaction (h_n) 374 at time n that the snapshot s_n was taken. A min_finished_xid 382 may be determined by identifying the minimum of the finished_xids 380.

In some embodiments, a latest xid of the MV (mv_xid 384) may be equal to the highest committed written transaction (h_k) 372. As discussed above regarding the staleness check technique to determine whether the MV is fresh, because the mv_xid is equal to h_k, the MV is fresh at time k. Moreover, because mv_xid 384 is equal to h_k, the highest committed written transaction, and therefore in comparison with max_dml_xid [1] 390 based on A_k 360, the MV would be considered fresh as the DML operations are associated with A_k 360 that are not committed. However, in the current refresh based on snapshot s_n 352, there may be a new dml operation that has been performed, max_dml_xid [0] 392. In some embodiments, the max_dml_xid [0] 392 may be the latest DML xid, and therefore may have a maximum DML transaction id (max_dml_xid 394) of all the base tables. Because the max_dml_xid 392 is larger than the mv_xid that was found to be equal to max_dml_xid [0] 390, the MV may be determined to be stale and an incremental refresh performed with the shared table.

In some embodiments, to obtain those changes between snapshots for an incremental update, various queries, sometimes referred to as "delta queries" or delta operations may be performed.

For example, s_n=(h_n, A_n) which is the current snapshot and s_k=(h_k, A_k) which is the previous snapshot may both require delta operations. In some embodiments, a Create a Table as Select (CTAS) may be a delta operation specified as:
CREATE TABLE . . . AS (
SELECT . . . FROM . . . AS "base_table" HERE
--VISIBLE UNTIL SNAPSHOT (h_n, A_n)
("base_table". "insertxid"<=h_n AND "base_table". "insertxid" NOT IN A_n)
AND
("base_table". "deletexid">h_n OR "base_table". "deletexid" IN A_n)
);
In some embodiments, an example delta query for inserts to apply may be:
INSERT INTO . . . (
SELECT . . . FROM . . . AS "base_table" WHERE
--VISIBLE UNTIL SNAPSHOT (h_n, A_n)
("base_table". "insertxid"<=h_n AND "base_table". "insertxid" NOT IN A_n)
AND
("base_table". "deletexid">h_n OR "base_table". "deletexid" IN A_n)
AND
--INSERTED AFTER SNAPSHOT (h_k, A_k)
("base_table". "insertxid">h_k OR "base_table". "insertxid" IN A_k)
);
In some embodiments, an example delta delete query may be:
DELETE FROM . . . (
SELECT . . . FROM . . . AS "base_table" WHERE
--VISIBLE FROM SNAPSHOT (h_k, A_k)
("base_table". "insertxid"<=h_k AND "base_table". "insertxid" NOT IN A_k)

AND
("base_table". "deletexid">h_k OR "base_table". "deletexid" IN A_k)
--DELETED UNTIL SNAPSHOT (h_n, A_n)
("base_table". "deletexid"<h_n AND "base_table". "deletexid" NOT IN A_n)
);

In some embodiments, these delta operations may be invoked using pre-generated procedures. For example:
mv_sp_< . . . > (
start_xid bigint,//=h_k
end_xid bigint,//=h_n
Recompute_MV bool,//=false
finished_xid_list varchar (65535)//={aˆj_k in A_k: aˆj_k is committed by s_n}
)

In some embodiments, at time k, the previous incremental refresh may include all committed transaction up to h_k 372 while it excluded all active transactions in A_k 360. Specifically, active transactions s.t. aˆj_k<h_k were excluded by a filter on an explicit list while active transactions s.t. aˆj_k>h_k were implicitly excluded by a filter on h_k.

In some embodiments, at time n, each active transactions aˆj_k in A_k 360 from time k may be in one of these states:
Still in flight=>aˆj_k in current A_n.
Committed=>aˆj_k became some h_i in another snapshot s_i in [s_k, s_n].
Rolled back=>aˆj_k is not visible on any base tables and thus can be ignored.

In some embodiments, at time n, current incremental refresh may consider snapshot s_n, where h_n 374 is the highest committed written transaction, hence incremental refresh may include all committed transactions. All previous active transactions from A_k 360 may be filtered out and considered by the next incremental refresh if they are still inflight (state 1), covered if they have been committed (state 2), or ignored if they have been aborted (state 3).

Staleness checks and incremental refresh may be applied in scenarios where multiple shared tables from different producer clusters are used to create a materialized view. Note that every data sharing cluster may have its own transaction space, while incremental MVs currently assume a single local cluster with a single transaction space. For this, a distinct set of transaction parameters may be handled per cluster. Staleness checks may be separately for each producer cluster and its set of associated base tables. Each staleness check may be performed independently using the snapshot of the respective producer cluster. The MV is stale if it is stale for any of the producer clusters. For example, a set of finished_xids and a mv_xid may be determined per producer cluster.

In some embodiments, a materialized view may be checked for update automatically (e.g., by a poll worker process or other component) that uses the techniques to determine whether a materialized view is stale and which technique can be used to update it.

In some embodiments, materialized views on data shares that support incremental updates may be a features that is enabled or disabled on producer processing clusters. For example, there may be scenarios when the feature has been deployed and has been always active on producer since MV creation on consumer (Grand Unified Configuration (GUC) always on). In some embodiments, there may be two sub-cases:
Some event occurred since MV creation.
No event occurred since MV creation.

In some embodiments, there may be scenarios when the feature is/was turned off on producer since MV creation. There may be two subcases of backward compatibility:
The feature was deactivated on producer cluster after MV creation on consumer cluster (GUC turned off, on/off/on).
Consumer cluster creates a MV but producer cluster is on an older version of the producer cluster (feature has never been deployed).

Thus, in total, four sub-cases may be distinguished: Valid Xid, No Xid, Unreliable Xid, Default Xid.

A producer cluster may communicate to the consumer cluster the xids of four events: attribute change, procedure change, data rearrangement, DML. Based on the xids of these events, the consumer cluster determines schema integrity and staleness for the MV. The following table shows the action that may be performed by the consumer cluster on each event, for each of the four sub-cases of backward compatibility.

TABLE 1

| | GUC on since MV creation | | GUC off since MV creation | |
| --- | --- | --- | --- | --- |
| Xid of event | Valid Xid | No Xid | Unreliable Xid | Default Xid |
| attribute_change_xid | Xid > mv_xid ? recompute : fresh | fresh | recompute | recompute |
| proc_change_xid | Xid > mv_xid ? recompute : fresh | fresh | recompute | recompute |
| structure_change_xid | Xid > mv_xid ? recompute : fresh | fresh | recompute | recompute |
| max_dml_xid | Xid > mv_xid ? stale : fresh | fresh | stale | stale |

Given the actions described above, values may be determined for the following sub-cases:
No Xid: Producer may return some Xid s.t. Xid<mv_xid. Return guc_xid.
Unreliable Xid: Producer may return some Xid s.t. Xid>mv_xid. Return max (Xid, guc_xid).
Default Xid: Producer may return some Xid s.t. Xid>mv_xid.
The protobuf default may be set to Max TransactionId.
The value of guc_xid may be persisted and updated on cluster startup:
GUC is flipped to off: guc_xid←Max TransactionId.
GUC is flipped to on: guc_xid←GetCurrentTransactionXid ( ).

Figure 4:
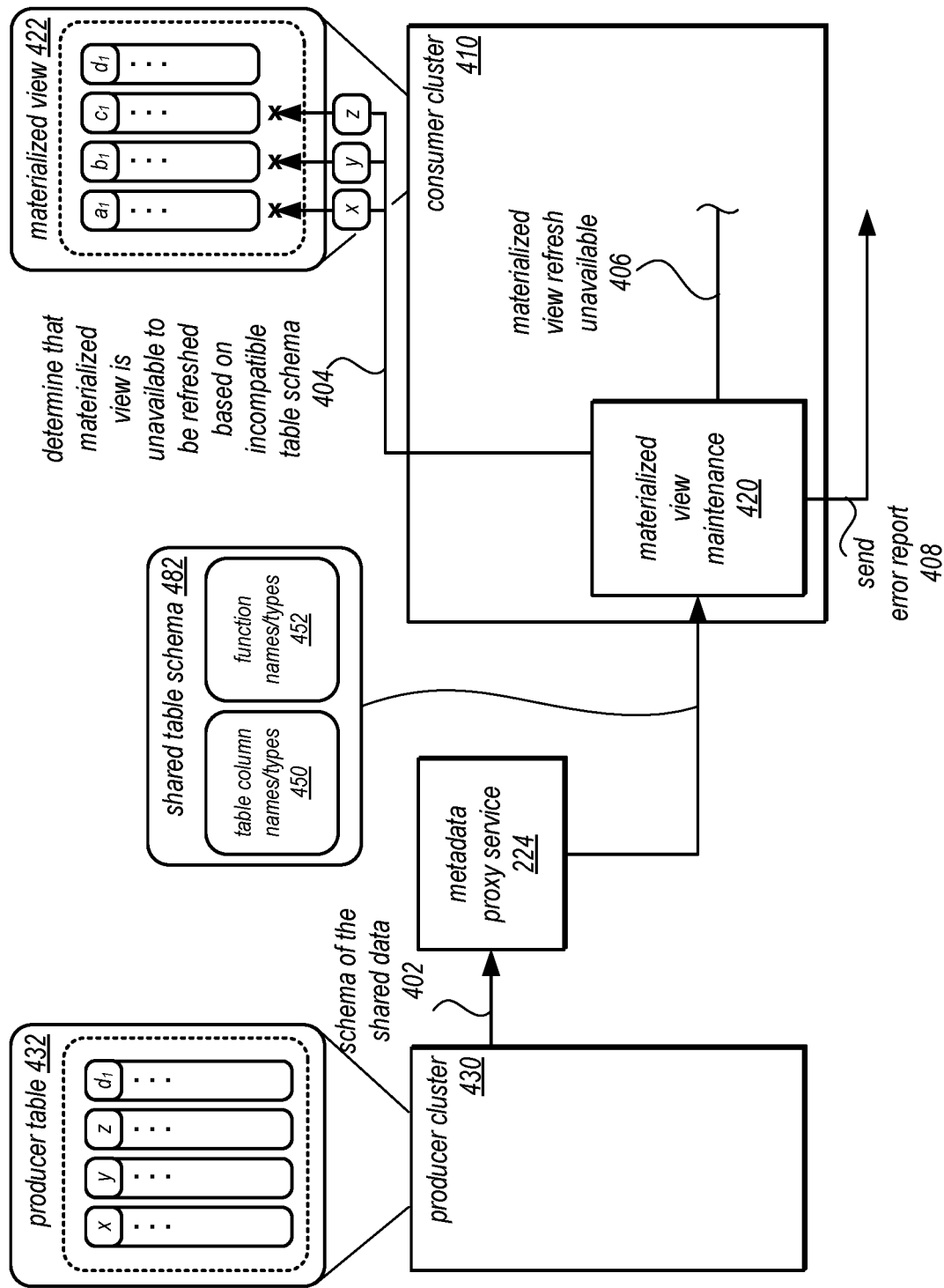
FIG. 4 is a logical block diagram illustrating materialized view management that implements checking schema compatibility of a data sharing producer table and determining whether a materialized view in a consumer resource is refreshable or unrefreshable, according to some embodiments.

FIG. 4 is a logical block diagram illustrating materialized view management that implements checking schema compatibility of a data sharing producer table, according to some embodiments.

In some embodiments, the consumer processing cluster 410 and the producer cluster 430 may be query processing clusters and may distribute execution of a query among multiple computational (which may also be referred to as "compute") nodes. As illustrated in this example, the consumer processing cluster 440 and producer cluster 430 may include a leader node and various compute nodes, which may communicate with each other over an interconnect (not illustrated). Leader node may implement query planning to generate query plan(s), query execution for executing queries on processing cluster that perform data processing that can utilize remote query processing resources for remotely stored data such as database data 272 stored in a data lake service 270. In some embodiments, each node in a processing cluster may include attached storage, on which a database (or portions thereof) may be stored on behalf of clients (e.g., users, client applications, and/or storage service subscribers).

Metadata proxy service 224 to obtain the schema of the shared data 402 of the producer cluster 430. In some embodiments, the table schema may indicate data types (e.g., character, string, integer, floating point, etc.), column names, and/or other table information. In some embodiments, a producer table schema 482 that includes table column names and/or types 450 and table function names/types 452 may be obtained using the metadata proxy service 224. The materialized view maintenance 420 of consumer cluster 410 may use the producer table schema 482 to determine whether the materialized view in the consumer cluster is unavailable to be refreshed based on incompatible table schema 404. The materialized view maintenance 220 may check schema compatibility check of data sharing base tables and decide if a MV is refreshable or unrefreshable before performing the refresh of the materialized view and/or before performing further checks to perform incremental refresh of the materialized view. In some embodiments, the incremental refresh checks may be performed automatically based on certain time interval and or may be performed manually based on a request received by the materialized view maintenance 420 to refresh the materialized view 422. In other embodiments, the materialized view maintenance 420 may initiate the refresh of the materialized view based on fulfillment of other conditions, such as detection of certain operations in snapshots.

For example, the materialized view 420 may be subject to both RENAME and DROP operations performed in the producer table 432. Because, in some embodiments, the refresh operation may be SQL-based and rely on object names instead of object identification strings ("oids"), certain changes in the schema may make the materialized view 432 unable to be refreshed. In some embodiments, the materialized view maintenance 220 determines whether one or more of the column names and/or types 450 of the table are equal to respective column names and types of the materialized view 422. In some embodiments, if the table names and/or types are not equal then refresh of the materialized view is determined to be unavailable 406. For example, as illustrated in FIG. 4, the column names of the producer table 432 has been changed to x, y, and z as opposed to columns a, b, and c respectively. Based on the determination that the column names are different, the materialized view is unable to be refreshed. Similar determination may be made regarding table function names/types 452 obtained in the producer table schema 482. If the materialized view maintenance 220 determines that the table function names and/or types are not equal then refresh of the materialized view is determined to be unavailable 406. In some embodiments, an error report may be sent 408 by the materialized view maintenance 420 to one or more clients. In some embodiments, error report may be sent but the dependencies of the materialized views may not drop despite the determination of incompatible table schema.

Figure 5:
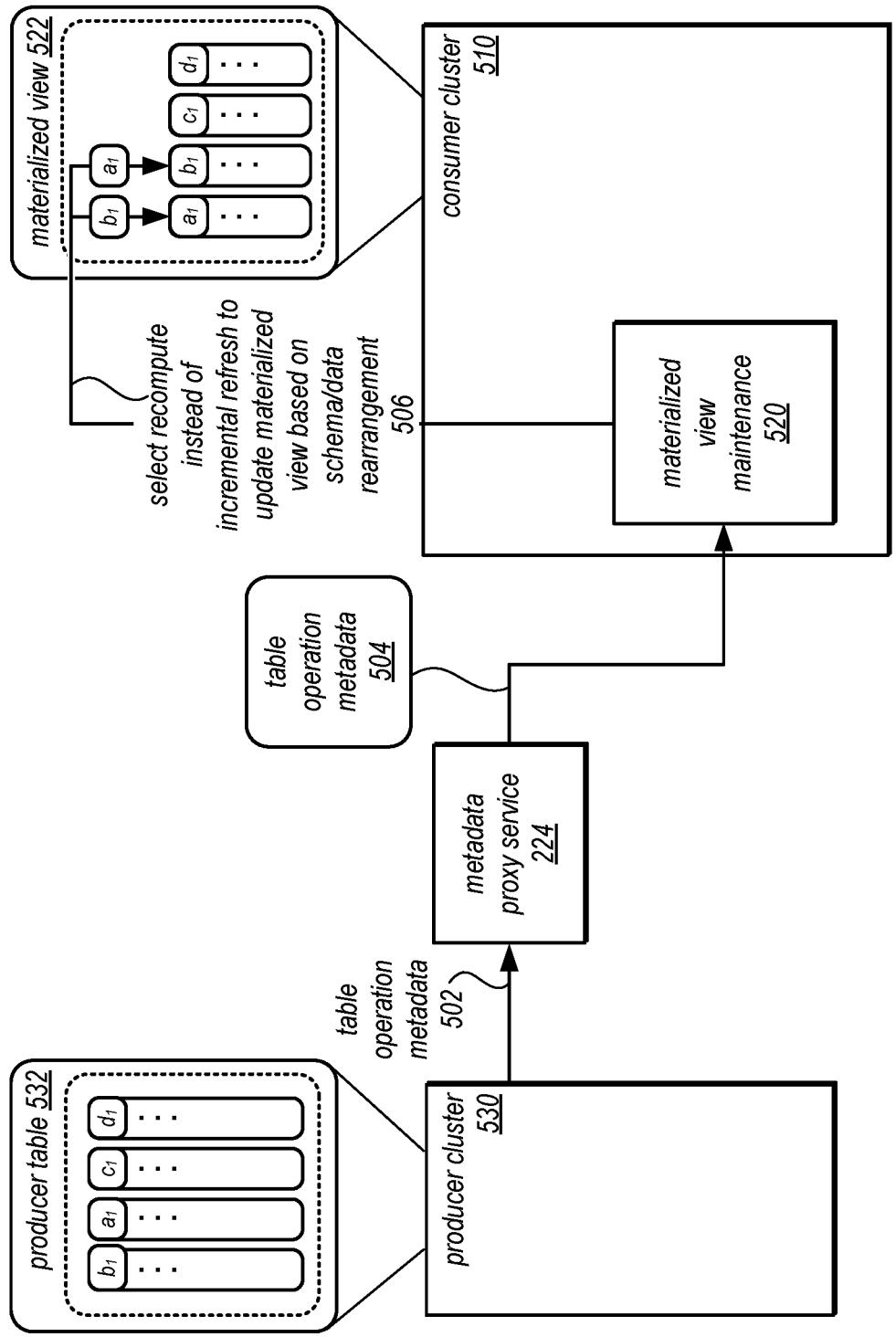
FIG. 5 is a logical block diagram illustrating materialized view management that implements assessing schema/data rearrangement operations on data sharing producer table and determining whether a materialized view in a consumer resource is available or unavailable for incremental refresh, according to some embodiments.

FIG. 5 is a logical block diagram illustrating materialized view management that implements assessing schema/data rearrangement operations on data sharing producer table and determining whether a materialized view in a consumer resource is available or unavailable for incremental refresh, according to some embodiments. In some embodiments, once the materialized view maintenance 520 that the materialized view 522 is able to be refreshed based on compatible schema, the materialized view maintenance 520 may determine whether the materialized view 522 is able to be refreshed incrementally or requires a full recompute. As discussed above, in some embodiments, the materialized view may undergo a faster incremental refresh using only the deltas of the producer table that have been committed since the previous update by obtaining snapshots of the producer tables instead of requiring a full recompute.

However, in the presence of schema rearrangement operations on the producer table the materialized view maintenance 520 may not be able to incrementally refresh the materialized view 522 and may fall back to a full recomputation of the materialized view 522. For example, FIG. 5 illustrates a producer table 532 having undergone operations that swaps base table's attribute b with a but preserves its name, type, attribute number. The materialized view maintenance 520 determines based on the initial schema validity determination (as discussed in FIG. 4) that the materialized view 522 is able to be refreshed, but based on the determination of the rearrangement of the schema, perform a full recompute of the materialized view 506. In some embodiments, the materialized view maintenance 520 may use a table operation metadata 520 of the producer table 532 that may include operations on table attributes as described in the above example. The table operation metadata 504 may be obtain by the metadata proxy service 224 to determine the last transaction that altered each attribute on the producer cluster and perform the schema rearrangement determination.

For example, the last transaction that altered each attribute (last_change_xid) on the producer cluster may be determined. For simplicity, last_change_xid may be derieved for each attribute as its corresponding tuple value in pg_attribute.xmin. At MV refresh time, we communicate last_change_xid to the consumer cluster along with RedcatGetRelation ( ) API call, and later compare it to the MV's xid (mv_xid). A similar technique be performed for procedures. Thus, an exemplary way of performing a schema rearrange check may be for Tables: If oids are not equal then recompute. And, for Columns: If last_change_xid>mv_xid then recompute. And for Functions: if proc_change_xid>mv_xid then recompute. The MV may be recomputed by setting mv_xid=InvalidTransactionId if schema has been rearranged.

In some embodiments, the materialized view maintenance 520 may obtain data rearrangement operations from the table operation metadata 504 to determine that a data rearrangement has occurred in the producer table 532 and determine that a full recompute is necessary instead of incremental refresh of the materialized view. For example, operations on the producer table data such as ALTER TABLE DISTKEY/SORTKEY/DISTSTYLE, VACUUM, TRUNCATE and other small table conversion and requires a full recompute. For example, the materialized view maintenance 220 detect these operations to track whether data rearrangement has occurred and the materialized view 522 is therefore unable to be incrementally refreshed using deltas between snapshots and requires a full recompute.

In one exemplary technique, track a structure change xid for each table may be tracked as part of metadata for the table. In this way, mv_xid can be used to detect data rearrangement according to the following technique:

//Some MV's base tables have been touched by ALTER TABLE, VACUUM, TRUNCATE, etc.
for (TransactionId structure_chg_xid: structure_chg_xids)
if (structure_chg_xid>mv_xid) then recompute Although FIGS. 2-5 have been described and illustrated in the context of a database service, like a data warehouse service implementing a columnar relational database table, the various components illustrated and described in FIGS. 2-5 may be easily applied to other database or data storage systems that provide materialized views of database data to be shared between producers and consumers. As such, FIGS. 2-5 are not intended to be limiting as to other embodiments of a storage engine, query engine, a single or distributed database engine or management system, processing cluster, or other component that may implement using computer resources to perform queries that reference materialized views, including resources, hosts, systems, or devices that are separate from the query engine or database management system itself (e.g., an external data replication store or system).

Figure 6:
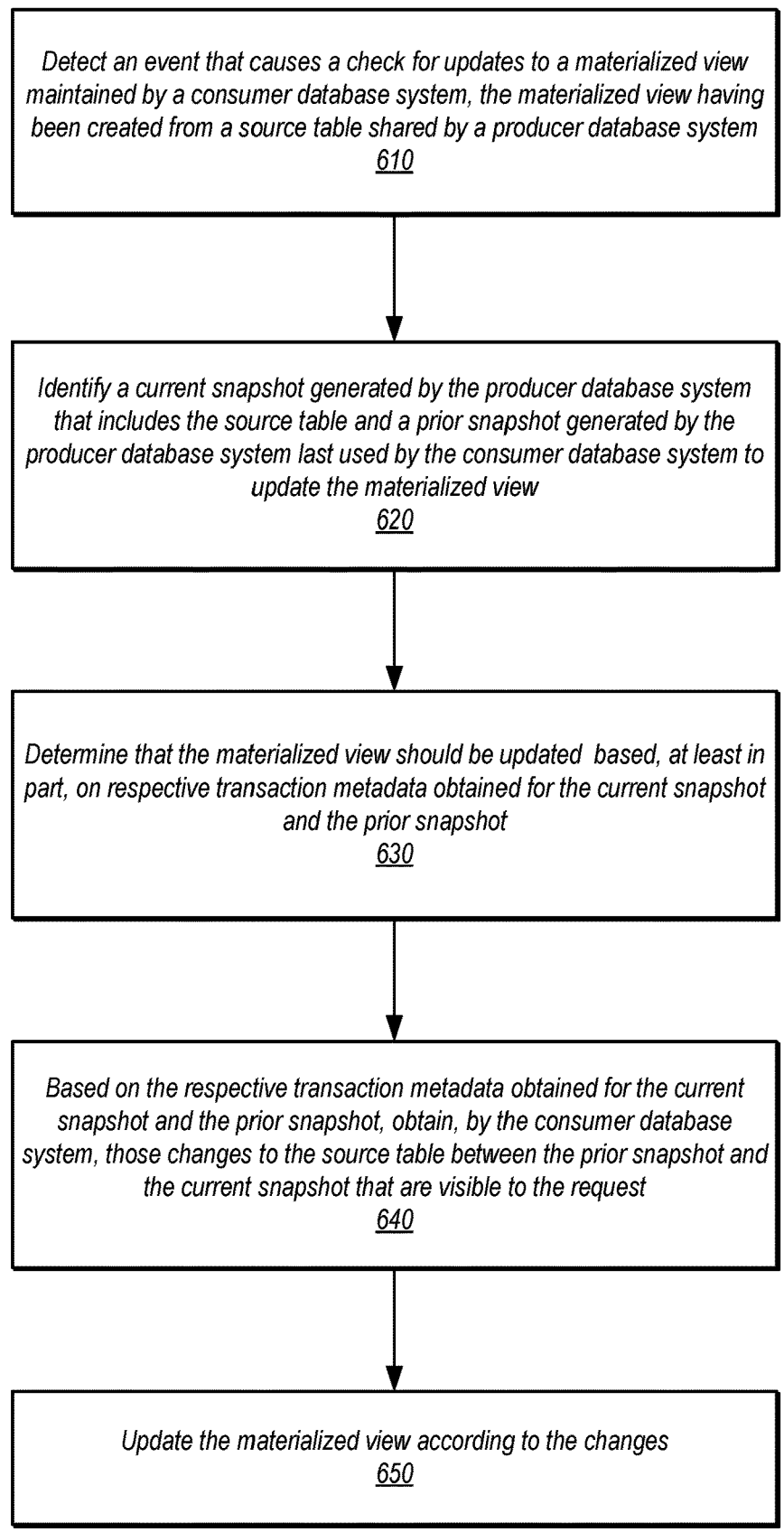
FIG. 6 is a high-level flowchart illustrating methods and techniques to implement refreshing, using a snapshot of a shared producer table, a materialized view in a consumer resource created from the shared producer table in a producer cluster, according to some embodiments.

FIG. 6 is a high-level flowchart illustrating methods and techniques to implement updating a materialized view created from an external table, according to some embodiments. Various different systems and devices may implement the various methods and techniques described below, either singly or working together. For example, a processing cluster, such as described above with regard to FIGS. 2-6 may implement the various methods. Alternatively, a combination of different systems and devices may implement the described techniques. Therefore, the above examples and or any other systems or devices referenced as performing the illustrated method, are not intended to be limiting as to other different components, modules, systems, or configurations of systems and devices.

As indicated at 610, an event may be detected that causes a check for updates to a materialized view maintained by a consumer database system, the materialized view having been created from a source table shared by a producer database system. For example, a poll or other automated update technique may be a triggering event to check for updates. In some embodiments, a query or other request that causes an access of a materialized view may be received and be the detected event.

As indicated at 620, a current snapshot generated by the producer database system may be identified that includes the source table and a prior snapshot generated by the producer database system last used by the consumer database system to update the materialized view As indicated at 630, a determination that the materialized view should be updated may be made based, at least in part, on respective transaction metadata obtained for the current snapshot and the prior snapshot.

As indicated at 640, based on the respective transaction metadata obtained for the current snapshot and the prior snapshot, obtain, by the consumer database system, those changes to the source table between the prior snapshot and the current snapshot that are visible to the request.

As indicated at 650, the materialized view may be updated according to the changes.

Figure 7:
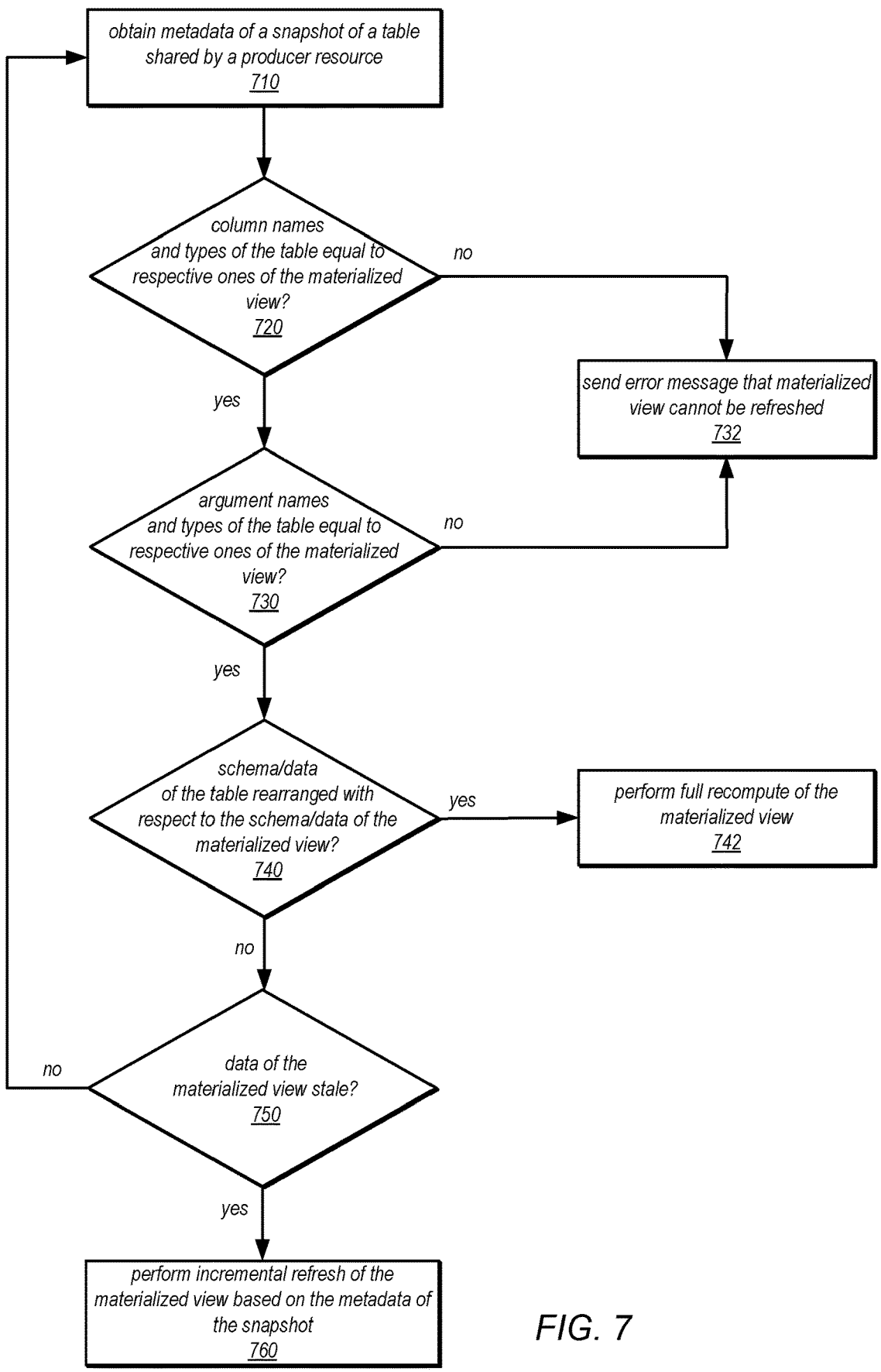
FIG. 7 is a high-level flowchart illustrating methods and techniques to implement determining whether a materialized view of a shared producer table is able to be refreshed and determining whether the materialized view requires full recompute or is able to be incrementally refreshed, according to some embodiments.

FIG. 7 is a high-level flowchart illustrating methods and techniques to implement determining whether a materialized view of a shared producer table is able to be refreshed and determining whether the materialized view requires full recompute or is able to be incrementally refreshed, according to some embodiments. As indicated at 710, metadata of a snapshot of a table shared by a producer resource may be obtained.

As indicated at 720, determination as to whether column names and types of the table equal to respective ones of the materialized view is made. At 730, determination as to whether argument names and types of the table equal to respective ones of the materialized view is made. As discussed above, in some embodiments, the schema determination may be performed automatically as part of an automatic MV refresh request based on certain time interval and or may be based on a request received by a materialized view maintenance to refresh the materialized view. In other embodiments, the materialized view maintenance may initiate the refresh of the materialized view based on fulfillment of other conditions, such as detection of certain operations in snapshots.

As indicated at 732, error message that materialized view cannot be refreshed is sent upon determination that the column names and/or types of the table does not equal respective ones of the materialized. Furthermore, upon determination that argument names and types of the table does not equal respective ones of the materialized view, an error message that the materialized view cannot be refreshed may be sent.

As indicated at 740, determination as to whether schema/data of the table rearranged with respect to the schema/data of the materialized view is made. Upon determination that schema and/or data of the table has been rearranged, as indicated at 742, full recompute of the materialized view is performed.

As indicated at 750, determination as to whether data of the materialized view stale is made. Upon determination that the materialized view is stale, as indicated at 760, incremental refresh of the materialized view based on the metadata of the snapshot performed. As discussed above, staleness check, may be performed independently using the snapshot of the respective producer cluster when the data sharing table contains data from multiple clusters.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of implement incrementally refreshing, using a snapshot of a data sharing producer table, a materialized view in a consumer resource created from the shared producer table in a producer resources as described herein may be executed on one or more computer systems, which may interact with various other devices. One such computer system is illustrated by FIG. 8. In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. Display(s) 880 may include standard computer monitor(s) and/or other display systems, technologies or devices. In at least some implementations, the input/output devices 850 may also include a touch- or multi-touch enabled device such as a pad or tablet via which a user enters input via a stylus-type device and/or one or more digits. In some embodiments, it is contemplated that embodiments may be implemented using a single instance of computer system 800, while in other embodiments multiple such systems, or multiple nodes making up computer system 800, may host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 820 may store program instructions and/or data accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 820 as program instructions 825 and data storage 835, respectively. In other embodiments, program instructions and/or data may be received, sent or stored upon different types of computer-accessible media or on similar media separate from system memory 820 or computer system 800. Generally speaking, a non-transitory, computer-readable storage medium may include storage media or memory media such as magnetic or optical media, e.g., disk or CD/DVD-ROM coupled to computer system 800 via I/O interface 830. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 840.

In one embodiment, I/O interface 830 may coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may allow data to be exchanged between computer system 800 and other devices attached to a network, such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or retrieving data by one or more computer system 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

Figure 8:
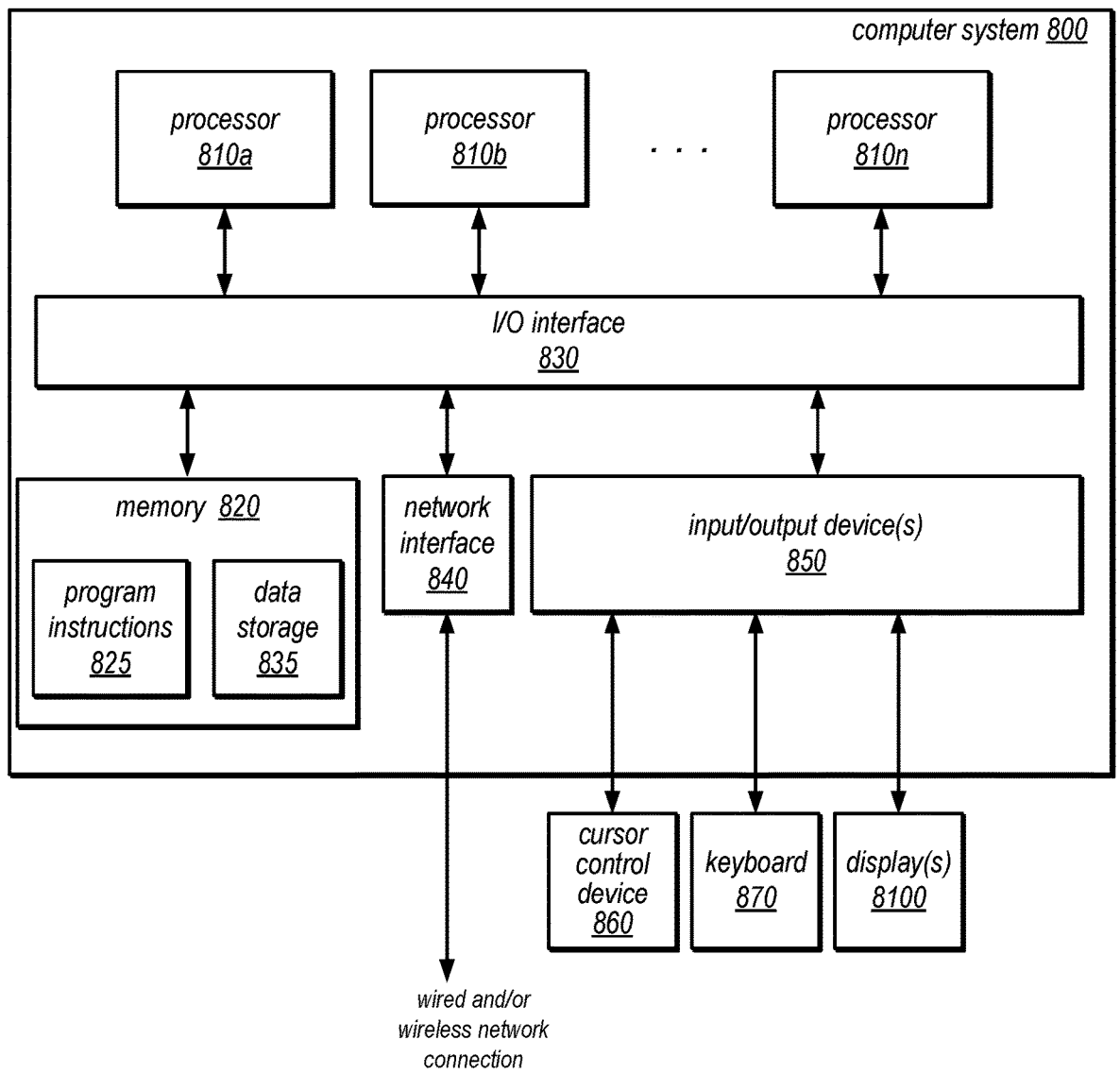
FIG. 8 illustrates an example system to implement the various methods, techniques, and systems described herein, according to some embodiments.

As shown in FIG. 8, memory 820 may include program instructions 825, may implement the various methods and techniques as described herein for implementing optimizing selection of materialized views for creation or refresh, and data storage 835, comprising various data accessible by program instructions 825. In one embodiment, program instructions 825 may include software elements of embodiments as described herein and as illustrated in the Figures. Data storage 835 may include data that may be used in embodiments. In other embodiments, other or different software elements and data may be included.

Those skilled in the art will appreciate that computer system 800 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a plurality of computing devices, respectively comprising a memory and a processor, that implement a database service, wherein the database service comprises a consumer processing cluster and a producer processing cluster, wherein the consumer processing cluster is configured to:
   receive query that causes an access to a materialized view, wherein the materialized view was created via a request received at the consumer processing cluster, wherein the materialized view is created from a source table shared by the producer processing cluster;
   identify a current snapshot generated by the producer processing cluster that includes the source table and a prior snapshot generated by the producer processing cluster last used by the consumer processing cluster to update the materialized view;
   determine that the materialized view should be updated to perform the query based, at least in part, on respective transaction metadata obtained for the current snapshot and the prior snapshot, wherein the respective transaction metadata for the current snapshot indicates a first set of active transactions, wherein the respective transaction metadata for the prior snapshot indicates a second set of active transactions, and wherein the determination compares the first set of active transactions with the second set of active transactions to identify respective transactions states for the first set of active transactions and the second set of active transactions out of possible transaction states comprising in flight state, committed state, and rolled back state;

based on the respective transaction metadata obtained for the current snapshot and the prior snapshot, query a data store that stores the prior snapshot and the current snapshot to obtain those changes to the source table between the prior snapshot and the current snapshot that are visible to the request;

update the materialized view according to the changes; and perform the request that accesses the materialized view using the updated materialized view.

2. The system of claim 1, wherein the consumer processing cluster is further configured to:

determine that a schema for the source table is valid prior to obtaining those changes to the source table between the prior snapshot and the current snapshot that are visible to the request and updating the materialized view according to the changes.

3. The system of claim 2, wherein the consumer processing cluster is further configured to:

based on a determination that the schema for the source table is not valid prior to obtaining those changes to the source table between the prior snapshot and the current snapshot that are visible to the request, send an error report.

4. The system of claim 1, wherein the source table is one of a plurality of source tables used to create the materialized view, wherein a different source table of the plurality of source tables is shared with the consumer processing cluster by a different producer processing cluster, and wherein determining that the materialized view should be updated to perform the request is further based on different respective transaction metadata obtained for a current snapshot of the different source table and a prior snapshot of the different source table.

5. A method, comprising:

detecting, at a consumer database system, an event that causes a check for updates to a materialized view maintained by the consumer database system, wherein the materialized view is created from a source table shared by a producer database system;

identifying, by the consumer database system, a current snapshot generated by the producer database system that includes the source table and a prior snapshot generated by the producer database system last used by the consumer database system to update the materialized view;

determining, by the consumer database system, that the materialized view should be updated based, at least in part, on respective transaction metadata obtained for the current snapshot and the prior snapshot, wherein the respective transaction metadata for the current snapshot indicates a first set of active transactions, wherein the respective transaction metadata for the prior snapshot indicates a second set of active transactions, and wherein the determination compares the first set of active transactions with the second set of active transactions to identify respective transactions states for the first set of active transactions and the second set of active transactions out of possible transaction states comprising in flight state, committed state, and rolled back state;

based on the respective transaction metadata obtained for the current snapshot and the prior snapshot, obtaining, by the consumer database system, those changes to the source table between the prior snapshot and the current snapshot that are visible to the request; and updating, by the consumer database system, the materialized view according to the changes.

6. The method of claim 5, further comprising determining, by the consumer database system, that a schema for the source table is valid prior to obtaining those changes to the source table between the prior snapshot and the current snapshot that are visible to the request and updating the materialized view according to the changes.

7. The method of claim 6, further comprising based on determining that the schema for the source table is not valid prior to obtaining those changes to the source table between the prior snapshot and the current snapshot that are visible to the request, sending an error report.

8. The method of claim 5, further comprising determining, by the consumer database system, that a schema for the source table is not rearranged prior to obtaining those changes to the source table between the prior snapshot and the current snapshot that are visible to the request and updating the materialized view according to the changes.

9. The method of claim 5, further comprising determining, by the consumer database system, that data of the source table are not rearranged prior to obtaining those changes to the source table between the prior snapshot and the current snapshot that are visible to the request and updating the materialized view according to the changes.

10. The method of claim 5, further comprising:

determining, by the consumer database system, that support for incremental refresh of materialized views is disabled at the producer database system; and after detecting a subsequent event that causes a check for updates to the materialized view maintained by the consumer database system, performing a full recompute of the materialized view based on the source table shared by the producer database system.

11. The method of claim 5, wherein the source table is one of a plurality of source tables used to create the materialized view, wherein a different source table of the plurality of source tables is shared with the consumer database system by a different producer database system, and wherein determining that the materialized view should be updated to perform the request is further based on different respective transaction metadata obtained for a current snapshot of the different source table and a prior snapshot of the different source table.

12. The method of claim 5, wherein the materialized view is automatically updated based on the transaction metadata of the current snapshot at a specific time interval, wherein the transaction metadata for the current snapshot is updated automatically at the specific time interval.

13. One or more non-transitory, computer-readable storage media, storing program instructions that when executed on or across one or more computing devices cause the one or more computing devices to implement:

receiving, at a consumer database system, a request that accesses a materialized view maintained by the consumer database system, wherein the materialized view is created from a source table shared by a producer database system;

identifying, by the consumer database system, a current snapshot generated by the producer database system that includes the source table and a prior snapshot generated by the producer database system last used by the consumer database system to update the materialized view;

determining, by the consumer database system, that the materialized view should be updated based, at least in part, on respective transaction metadata obtained for the current snapshot and the prior snapshot, wherein the respective transaction metadata for the current snapshot indicates a first set of active transactions, wherein the respective transaction metadata for the prior snapshot indicates a second set of active transactions, and wherein the determination compares the first set of active transactions with the second set of active transactions to identify respective transactions states for the first set of active transactions and the second set of active transactions out of possible transaction states comprising in flight state, committed state, and rolled back state;

based on the respective transaction metadata obtained for the current snapshot and the prior snapshot, obtaining, by the consumer database system, those changes to the source table between the prior snapshot and the current snapshot that are visible to the request;

updating, by the consumer database system, the materialized view according to the changes; and performing, by the consumer database system, the request that accesses the materialized view using the updated materialized view.

14. The one or more non-transitory, computer-readable storage media of claim 13, wherein the instructions that when executed on or across one or more computing devices cause the one or more computing devices to further implement:

determining, by the consumer database system, that a schema for the source table is valid prior to obtaining those changes to the source table between the prior snapshot and the current snapshot that are visible to the request and updating the materialized view according to the changes.

15. The one or more non-transitory, computer-readable storage media of claim 14, wherein the instructions that when executed on or across one or more computing devices cause the one or more computing devices to further implement:

based on determining that the schema for the source table is not valid prior to obtaining those changes to the source table between the prior snapshot and the current snapshot that are visible to the request, sending an error report.

16. The one or more non-transitory, computer-readable storage media of claim 13, wherein the instructions that when executed on or across one or more computing devices cause the one or more computing devices to further implement:

determining, by the consumer database system, that a schema for the source table is not rearranged prior to obtaining those changes to the source table between the prior snapshot and the current snapshot that are visible to the request and updating the materialized view according to the changes.

17. The one or more non-transitory, computer-readable storage media of claim 13, wherein the instructions that when executed on or across one or more computing devices cause the one or more computing devices to further implement:

determining, by the consumer database system, that data of the source table are not rearranged prior to obtaining those changes to the source table between the prior snapshot and the current snapshot that are visible to the request and updating the materialized view according to the changes.

18. The one or more non-transitory, computer-readable storage media of claim 13, wherein the instructions that when executed on or across one or more computing devices cause the one or more computing devices to further implement:

determining, by the consumer database system, that a table argument names and types for the source table is valid prior to obtaining those changes to the source table between the prior snapshot and the current snapshot that are visible to the request and updating the materialized view according to the changes.

19. The one or more non-transitory, computer-readable storage media of claim 13, wherein the source table is one of a plurality of source tables used to create the materialized view, wherein a different source table of the plurality of source tables is shared with the consumer database system by a different producer database system, and wherein determining that the materialized view should be updated to perform the request is further based on different respective transaction metadata obtained for a current snapshot of the different source table and a prior snapshot of the different source table.

20. The one or more non-transitory, computer-readable storage media of claim 13, wherein the materialized view is automatically updated based on the transaction metadata of the current snapshot at a specific time interval, wherein the transaction metadata for the current snapshot is updated automatically at the specific time interval.

* * * * *